United States Patent
Binhussain et al.

(10) Patent No.: US 10,570,049 B2
(45) Date of Patent: Feb. 25, 2020

(54) SELF GLAZED CERAMIC/GLASS COMPOSITE AND METHOD FOR MANUFACTURING THE SAME

(71) Applicant: King Abdul Aziz City for Science and Technology (KACST), Riyadh (SA)

(72) Inventors: Mohammed A Binhussain, Riyadh (SA); Esmat M A Hamzawy, Cairo (EG); Omar A Alharbi, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 14/839,877

(22) Filed: Aug. 28, 2015

(65) Prior Publication Data

US 2015/0368142 A1 Dec. 24, 2015

Related U.S. Application Data

(62) Division of application No. 13/726,291, filed on Dec. 24, 2012, now abandoned.

(51) Int. Cl.
| | |
|---|---|
| *C03B 32/02* | (2006.01) |
| *C03B 1/02* | (2006.01) |
| *C04B 35/622* | (2006.01) |
| *C04B 33/13* | (2006.01) |
| *C04B 33/132* | (2006.01) |
| *C04B 35/626* | (2006.01) |
| *C03C 8/00* | (2006.01) |

(52) U.S. Cl.
CPC ............... *C03B 32/02* (2013.01); *C03B 1/02* (2013.01); *C03C 8/00* (2013.01); *C04B 33/13* (2013.01); *C04B 33/1324* (2013.01); *C04B 35/6261* (2013.01); *C04B 35/62204* (2013.01); *C04B 2235/3418* (2013.01); *C04B 2235/36* (2013.01); *C04B 2235/5436* (2013.01); *C04B 2235/602* (2013.01); *C04B 2235/6562* (2013.01); *C04B 2235/6567* (2013.01); *C04B 2235/77* (2013.01); *C04B 2235/96* (2013.01); *C04B 2235/9692* (2013.01); *Y02P 40/69* (2015.11)

(58) Field of Classification Search
CPC .............. C04B 32/02; C04B 35/62204; C04B 35/6261; C04B 33/13; C04B 33/1324; C03B 1/02; C03C 8/00
See application file for complete search history.

(56) References Cited

U.S. PATENT DOCUMENTS

| | | | | | |
|---|---|---|---|---|---|
| 2,760,881 | A | * | 8/1956 | Toulmin, Jr. ............ | B28B 1/526 156/209 |
| 3,674,519 | A | * | 7/1972 | Higuchi .................. | C04B 33/02 174/140 R |
| 4,313,900 | A | * | 2/1982 | Gonzales, Jr. ........ | C04B 35/111 264/133 |
| 5,830,251 | A | * | 11/1998 | Simpson ................. | C03B 5/005 501/155 |

(Continued)

*Primary Examiner* — Nahida Sultana (74) *Attorney, Agent, or Firm* — Steven M. Shape; Dennemeyer & Associates, LLC (57) ABSTRACT

The invention provides a glazed composite manufactured using waste materials, wherein the waste materials are capable of producing ceramic forming oxides, glass modifying oxides and ceramic modifying oxides. The waste materials include ceramic waste and colored glass waste. The invention also provides a method for manufacturing composition of the glazed composite.

16 Claims, 6 Drawing Sheets

(56) References Cited

U.S. PATENT DOCUMENTS

| | | | |
|---|---|---|---|
| 5,938,885 A * | 8/1999 | Huang | H01L 21/31111 |
| | | | 156/345.15 |
| 6,379,607 B1 * | 4/2002 | Oh | B28B 1/008 |
| | | | 264/600 |
| 2004/0171472 A1 * | 9/2004 | Taguchi | C03C 8/02 |
| | | | 501/17 |
| 2009/0062413 A1 * | 3/2009 | Adur | B29C 37/0032 |
| | | | 521/157 |
| 2011/0023389 A1 * | 2/2011 | Myers | E04B 1/003 |
| | | | 52/173.1 |

* cited by examiner

SELF GLAZED CERAMIC/GLASS COMPOSITE AND METHOD FOR MANUFACTURING THE SAME

FIELD OF THE INVENTION

The invention generally relates to a self glazed composite and a method for manufacturing the self glazed composite. More specifically, the invention relates to a self glazed composite manufactured using waste materials such as ceramic and colored glass with an optional addition of vitrification aids such as silica.

BACKGROUND OF THE INVENTION

Glazed ceramic composite are widely used in various industries. The glazed composite are mainly used for manufacturing tiles due to outstanding mechanical properties such as, but not limited to, high strength, toughness, translucency or opacity, low thermal expansion, high temperature resistance and high chemical durability. Glazes are widely used for coating ceramics in various industries. Glazes are generally used to color, decorate, strengthen and waterproof the ceramics. The glazes also exhibit properties of excellent scratch resistance and glossiness.

Generally, the glazes are prepared using raw materials such as, but not limited to, silica, zircon, kaolin, feldspar, dolomite, magnesium carbonate, boric acid and potassium nitrate in an industrial grade. A selected set of raw materials are thoroughly mixed and melted in a furnace at very high temperature to prepare molten raw materials. The molten raw materials are poured into water to obtain glass frits. The glass frits are ground in a mill, which are then used as glazes. These glazes are applied on ceramic bodies and fired at high temperature to obtain glazed ceramic bodies. Thus, the glazes are prepared separately and applied on the ceramic substrates. Further, the temperature used for firing and melting the raw materials are very high and consumes high amount of energy.

Additionally, wastes of ceramic and glass are immobilized by disposal in land-fills, used in road fills as a partial substitute for natural aggregate in concrete, or immobilized in cement industries as a substitute in varying proportions for cement in mortar and concrete. The ceramic wastes are also used in vitreous ceramic wastes which are used as immobile carrier for spent nuclear fuel and surplus plutonium. Economic justification for capital and operational costs of implementing such procedures for disposal of such waste tends to be very high.

Therefore, there is a need to develop a method for manufacturing glazed composite which is environment friendly, cost effective and has superior mechanical and chemical properties.

BRIEF DESCRIPTION OF THE FIGURE

The accompanying figure together with the detailed description below forms part of the specification and serves to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily for a glazed composite and in method steps related to manufacturing the glazed composite.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a glazed composite and a method for manufacturing the glazed composite. The glazed composite is manufactured using waste materials such as ceramic wastes and colored glass wastes. Additionally, silica sand can also be used as raw material along with the waste materials. The waste materials, which are capable of producing ceramic forming oxides, glass modifying oxides and ceramic modifying oxides, are selected.

Figure 1:
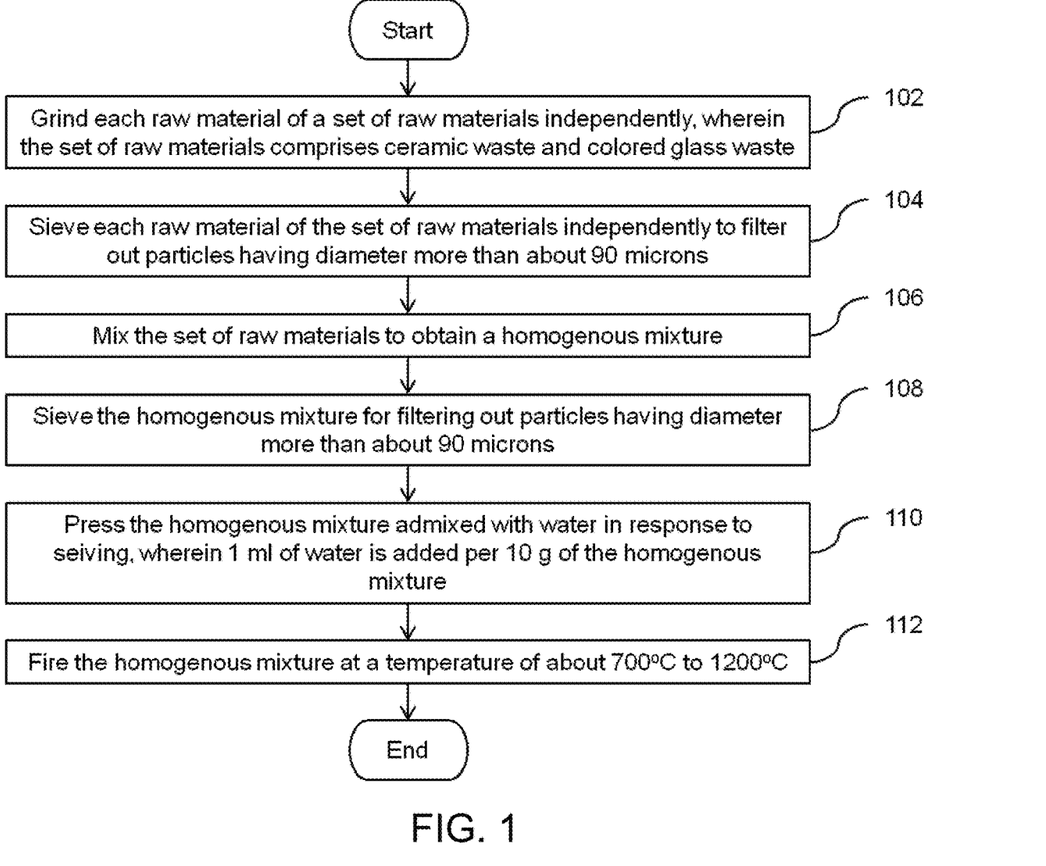
FIG. 1 illustrates a flow diagram of a method for manufacturing a glazed composite in accordance with an embodiment of the invention.

FIG. 1 illustrates a flow diagram of a method for manufacturing a glazed composite in accordance with an embodiment of the invention.

A specific set of raw materials are used to manufacture the glazed composite. The set of raw materials includes waste materials such as ceramic wastes and colored glass wastes. Additionally, silica sand can also be used as raw material along with the waste materials. The waste materials, which are capable of producing ceramic forming oxides, glass modifying oxides and ceramic modifying oxides, are selected. Other oxides such as, but not limited to, aluminum oxide ($Al_2O_3$), titanium dioxide ($TiO_2$), zirconium dioxide ($ZrO_2$), ferric oxide ($Fe_2O_3$), and manganese dioxide ($MnO_2$) can also be produced in various degrees in final formulation of the glazed composite. The waste materials are selected in such a way that the selected waste materials provide high amount of crystallize phases in the final formulation of the glazed composite. Colored glass waste is very beneficial as use of the colored glass waste decreases time and temperature required during the manufacturing process of the glazed composites. The raw materials have compositions which essentially includes components in weight percent as shown in table below.

TABLE

| Materials | Typical Chemical Composition | | | | | | | |
|---|---|---|---|---|---|---|---|---|
| | $SiO_2$ | $Al_2O_3$ | $Fe_2O_3$ | CaO | MgO | $Na_2O$ | $K_2O$ | $TiO_2$ |
| Ceramic waste | 63.80 | 17.40 | 6.10 | 6.55 | 1.90 | 1.27 | 3.05 | 0.80 |
| glass waste | 71.50 | 0.09 | 0.95 | 9.40 | 3.80 | 14.00 | | |
| Silica Sand | 90.35 | 1.78 | 0.47 | 5.25 | 0.18 | 1.50 | 0.04 | 0.09 |

Figure 2:
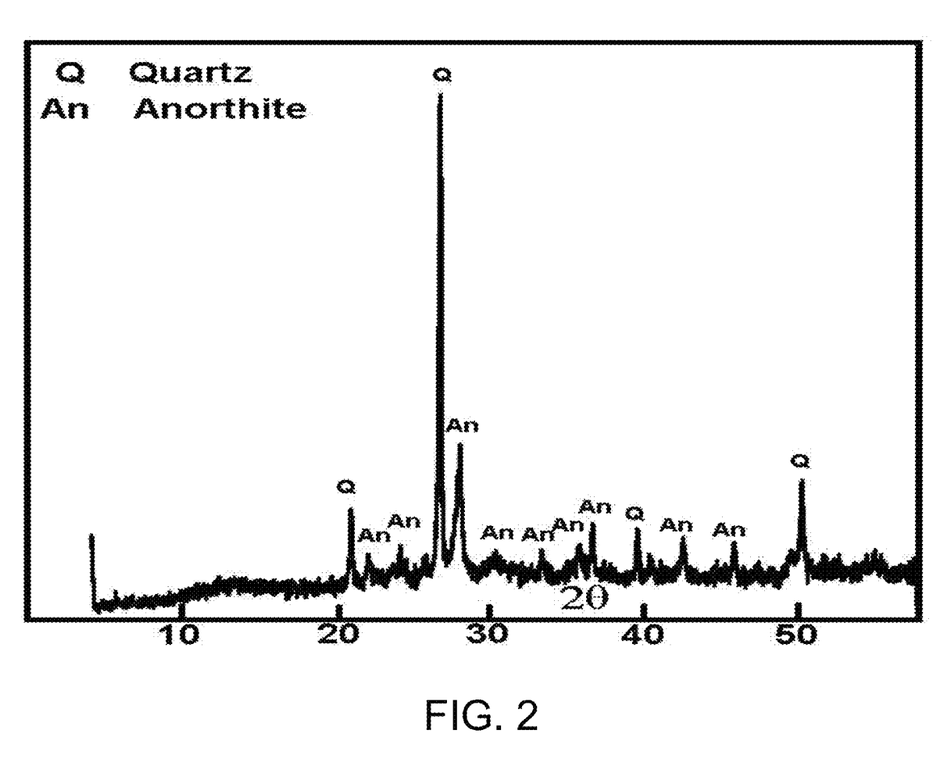
FIG. 2 illustrates sample X-ray diffraction of as received ceramic wastes.

The ceramic wastes are collected from local ceramic factory, mineralogically it contains alpha quartz and little anorthite. FIG. 2 illustrates X-ray diffraction of as received ceramic wastes.

At step 102, each raw materials of the set of raw materials are ground into powder. Any suitable grinding machine such as, but not limited to, a roll crusher, a ball mill or an impeller breaker can be used for grinding each raw material of the set of raw materials and as such those techniques would be apparent to those ordinarily skilled in the art. In an embodiment, each raw material of the set of raw materials is ground in a ball mill with a speed of about 400 revolutions per minute for a period of 30 minutes.

In an embodiment, the set of raw materials includes about 35 weight percent (wt %) to about 65 wt % of ceramic waste and about 15 wt % to about 85 wt % of colored glass waste.

In another embodiment, the set of raw materials includes about 25 wt % to about 46 wt % of silica sand, about 10 wt % to about 47 wt % of ceramic waste and about 25 wt % to about 46 wt % of colored glass waste.

At step 104, each raw materials sieved to filter out particles of diameter more than about 90 microns (p). The processing characteristics are optimized due to the use of particles of sizes of less than 90μ. In an embodiment, each raw material is sieved to filter out particles of diameter more than about 50 microns.

Thereafter, at step 106, the raw materials are mixed to obtain a homogenous mixture. In an embodiment, the raw materials are mixed in a dry ball mill to obtain a homogenous mixture. Moving on, at step 108, the homogenous mixture is sieved in order to filter out particles having diameter more than about 90 microns.

Thereafter, the homogenous mixture is admixed with water. The water is added such that the homogenous mixture has 1 milliliter (ml) of water per 10 grams (g) of the homogenous mixture. Subsequently, the homogenous mixture is pressed at step 110. In an embodiment, the homogenous mixture is pressed using one of uniaxial cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 110 and as such the techniques which can be used would be apparent to those ordinarily skilled in the art. For example, the homogenous mixture with the particles of sizes less than 90μ is uniaxially cold pressed at a pressure of about 50 Megapascal (MPa) to about 100 MPa in a mold.

Finally, at step 112, the homogenous mixture (green sample) is sintered at a temperature of about 700° C. to about 1200° C. In accordance with the embodiment, the homogenous mixture is fired at a temperature of about 700° C. to about 1200° C. with a rate of about 5° C. per minute to about 20° C. per minute for a period of about 15 minutes to about 2 hours 30 minutes.

In various embodiments of the invention, the glazed composite includes about 62 wt % to about 90 wt % of silicon dioxide ($SiO_2$), about 2 wt % to about 17 wt % of alumina ($Al_2O_3$), about 5 wt % to about 10 wt % of calcium oxide (CaO), about 2 wt % to about 14 wt % of sodium oxide ($Na_2O$), about 2 wt % to about 4 wt % of potassium oxide ($K_2O$), about 0.5 wt % to about 1.0 wt % of titanium dioxide ($TiO_2$) and about 0.1 wt % to about 5 wt % of ferric oxide ($Fe_2O_3$).

The glazed composite is prepared using waste materials such as ceramic wastes and colored glass wastes. Additionally, silica sand can also be used as raw material along with the waste materials. The waste materials, which are capable of producing ceramic forming oxides, glass modifying oxides and ceramic modifying oxides, are selected. Other oxides such as, but not limited to, aluminum oxide ($Al_2O_3$), titanium dioxide ($TiO_2$), zirconium dioxide ($ZrO_2$), ferric oxide ($Fe_2O_3$), and manganese dioxide ($MnO_2$) can also be produced in various degrees in final formulation of the glazed composites. The waste materials are selected in such a way that the selected waste materials provide high amount of crystallize phases in the final formulation of the composite.

In an embodiment, raw materials used to prepare the glazed composite includes about 35 wt % to about 65 wt % of ceramic waste and about 15 wt % to about 85 wt % of colored glass waste.

In another embodiment, raw materials used to prepare the composite includes about 25 wt % to about 46 wt % of silica's sand, about 10 wt % to about 47 wt % of ceramic waste and about 25 wt % to about 46 wt % of colored glass waste.

Consider an exemplary case of ternary components, green sample (homogenous mixture) with lowest ceramic waste is prepared by mixing 10 wt % ceramic waste admixed with 45 wt % colored glass and 45 wt % silica sand, while in case of highest ceramic waste, 44.45 wt % ceramic waste is admixed with 27.70 wt % colored glass and 27.70 wt % silica sand. However, in case of binary components, the green sample with lowest ceramic waste is prepared by mixing 10 wt % ceramic wastes admixed with 90 wt % colored glass, while the green sample with highest ceramic wastes contain 90 wt % ceramic wastes admixed with 10 wt % colored glass.

Figure 3:
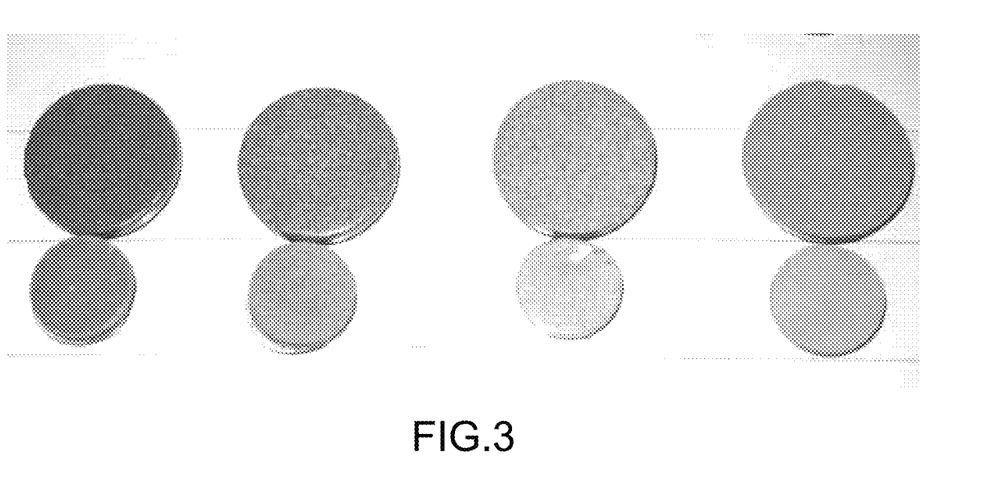
FIG. 3 illustrates glazed composite samples sintered at different temperatures up to 1200° C.
Figure 4:
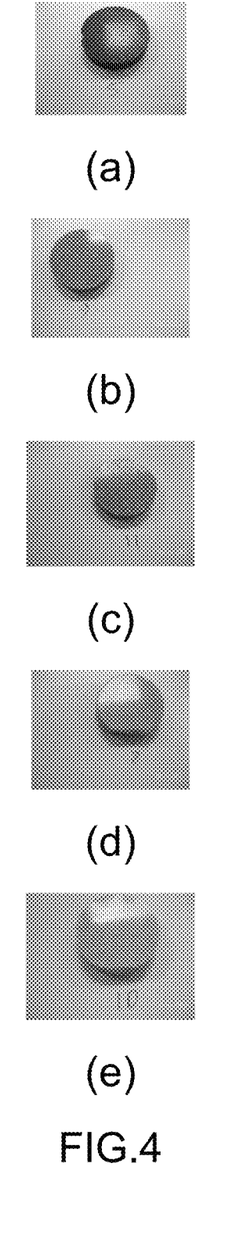
FIG. 4 illustrates self glazed composite samples sintered at different temperatures up to 1200° C.

FIG. 3 illustrates glazed composite samples sintered at different temperatures up to 1200° C. FIG. 4 illustrates self glazed composite samples (a, b, c, d and e) sintered at different temperatures up to 1200° C.

Figure 5:
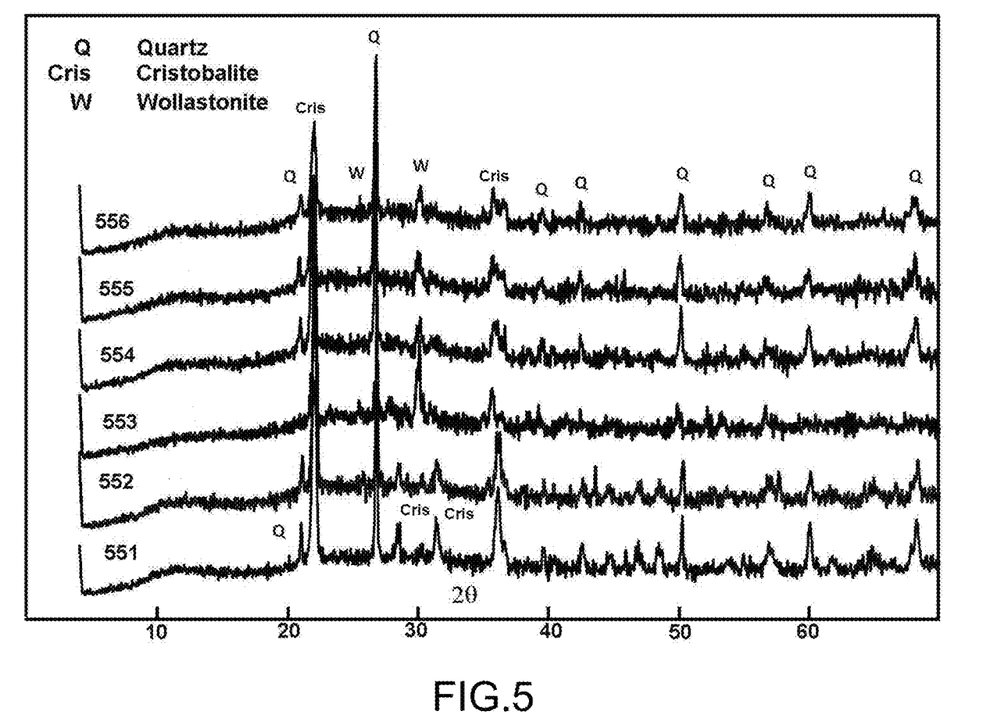
FIG. 5 illustrates X-ray diffraction analysis for developed crystalline phases in samples prepared using ceramic waste and color glass waste in addition to silica sand, sintered between 700° C. and 1200° C.

The glazed composite prepared using silica sand, ceramic waste and color glass waste includes about 62 wt % to 80 wt % quartz and cristobalite with low quartz crystalline phase. Other crystalline material comprises wollastonite ($CaSiO_3$). FIG. 5 illustrates X-ray diffraction analysis for developed crystalline phases in samples prepared using silica sand, ceramic waste and color glass waste and heated between 700° C. and 1200° C. The glazed composite sintered within the temperature ranges between 700° C. to 1200° C. and specified composition of the raw materials provides white ivory, light creamy, brown, light brown and dark brown coloration. At sintering temperature above 1000° C. with high $Al_2O$ content, interactions between constituents are evident. However intense quartz peaks is accompanied by peaks related to cristobalite and wollastonite. This may be a main factor which affects color changes from dark brown to light brown.

Figure 6:
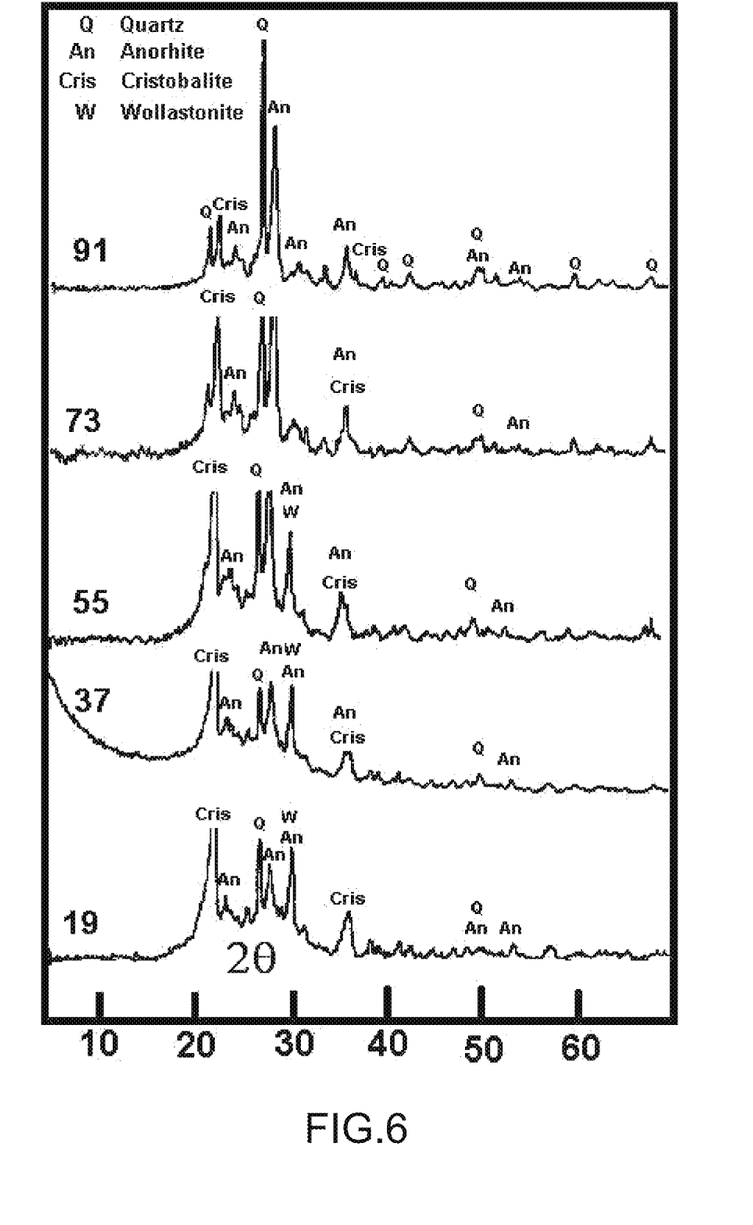
FIG. 6 illustrates X-ray diffraction analysis for developed crystalline phases in samples prepared using ceramic waste and color glass waste sintered between 700° C. and 1200° C.

The glazed composite prepared using ceramic waste and colored glass waste contain about 62 wt % to 80 wt % quartz and anorthite ($CaAl_2Si_2O_8$) crystalline phase. Other crystalline material comprising wollastonite ($CaSiO_3$) and cristobalite with low quartz. FIG. 6 illustrates X-ray diffraction analysis for developed crystalline phases in samples prepared using ceramic waste and color glass waste and heated between 700° C. and 1200° C. The glazed composite sintered within the temperature ranges between 700° C. to 1200° C. and specified composition of the raw materials provides light creamy, brown, light brown and dark brown coloration.

Various embodiments of the invention produce glazed composite with significantly improved properties. The glazed composite has improved micro-hardness and chemical durability. The vickers microhardness (VH) values for the glazed composite of the invention determined using procedures of ASTM E-384 ranges from about 550 Kilogram per square millimeter ($kg/mm^2$) to 650 $kg/mm^2$ which is equivalent to 5 to 6 in MOH' scale. The chemical durability is determined by weight loss of a test piece of 25×25×5 mm after 24 hours immersion in 1% sulphuric acid ($H_2SO_4$) solution at a temperature of 90° C. The chemical durability of the glazed composite in an acid medium is between 0.0062 milligram per square centimeter ($mg/cm^2$) to 0.1200 $mg/cm^2$. The chemical durability of the glazed composite was concluded from the developed phases such as quartz, cristobalite and anorthite. The density of the glazed composite of the invention ranges from 2.2382 grams per cubic centimeter ($g/cm^3$) to 2.0267 $g/cm^3$. In comparison to the existing composite products, the glazed composite produced by the invention has improved micro-hardness, low density and good chemical durability in the acid medium.

Various embodiments of the invention provides an environment friendly glazed composite as ceramic waste and glass wastes are used to manufacture the glazed composite. Further, the composite obtained using the invention is self glazed and there is no need to apply glazes separately. The glazed composite produced using the invention is classified as sustainable green materials. If the glazed composite is used in a building construction, the glazed composite can be recycled and reused, as per international green building criteria and standards. Thus, the environment friendly glazed composite can be used to produce wall, floor tiles and for cladding.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for manufacturing floor tiles, wall tiles, and cladding for buildings out of recycled materials, wherein the floor tiles, the wall tiles, and the cladding are self-glazing during the manufacturing and of high micro-hardness, low density, and high chemical durability, comprising:
    obtaining a set of raw materials including factory tailings comprising a ceramic waste and a colored glass waste;
    grinding each raw material of the set of raw materials independently;
    sieving each raw material of the set of raw materials independently to filter out particles having a diameter more than about 90 microns;
    mixing the set of raw materials to obtain a homogenous mixture;
    admixing the homogenous mixture with water, wherein approximately 1 liter of water is added per 10 kilograms of the homogenous mixture;
    pressing the homogenous mixture;
    pressing the homogenous mixture at a pressure between about 50 MPa and 100 MPa; and
    firing the homogenous mixture at a temperature of about 700 degrees C. to about 1200 degrees C. until the homogenous mixture self-glazes.

2. The method of claim 1, wherein each raw material of the set of raw materials is ground in a ball mill with a speed of about 400 revolutions per minute for a period of 30 minutes.

3. The method of claim 1, wherein each raw material and the homogenous mixture are sieved for filtering out particles having diameter more than about 50 microns.

4. The method of claim 1, wherein the set of raw materials is mixed in a dry ball mill to obtain the homogenous mixture.

5. The method of claim 1, wherein the homogenous mixture is pressed using one of uniaxially cold pressing, biaxial cold pressing, dry pressing, semi-dry pressing, compacting, cold isostatic pressing, hot pressing, extrusion molding, injection molding, compression molding, gel casting, slip casting and tape casting.

6. The method of claim 1, wherein the homogenous mixture is fired at a temperature of about 700 degrees C. to about 1200 degrees C. with a heating rate increase of about 5 degrees C. per minute to about 20 degrees C. per minute for a period of about 15 minutes to about 2 hours 30 minutes.

7. The method of claim 1, wherein the set of raw materials comprises about 35 wt % to about 65 wt % of the ceramic waste and about 15 wt % to about 85 wt % of the colored glass waste.

8. The method of claim 1, wherein the set of raw materials further comprises silica sand.

9. The method of claim 8, wherein the set of raw materials comprises about 25 weight percent (wt %) to about 46 wt % of silica sand, about 10 wt % to about 47 wt % of ceramic waste and about 25 wt % to about 46 wt % of colored glass waste.

10. The method of claim 1, wherein the ceramic waste comprises about 63.80 wt % of SiO2, about 17.40 wt % Al2O3, and about 6.10 wt % FeO3.

11. The method of claim 10, wherein the ceramic waste further comprises about 6.55 wt % CaO, about 1.90 wt % MgO, about 1.27 wt % Na2O, about 3.05 wt % K2O, and about 0.80 wt % TiO2.

12. The method of claim 1, wherein the colored glass waste comprises about 71.50 wt % SiO2, about 0.09 wt % $Al_2O_3$, and about 0.95 wt % Fe2O3.

13. The method of claim 12, wherein the colored glass waste further comprises about 9.40 wt % CaO, about 3.80 wt % MgO, and about 14.00 wt % Na2O.

14. The method of claim 1, wherein the floor tiles, the wall tiles, and the cladding have a hardness of about 5-6 on the Mohs hardness scales.

15. The method of claim 1, wherein the floor tiles, the wall tiles, and the cladding have a density of about 2.03 grams per cubic centimeter to about 2.24 drams per cubic centimeter.

16. The method of claim 1, wherein the floor tiles, the wall tiles, and the cladding have a durability of about 0.0062 milligrams per square centimeters to about 0.1200 milligrams per square centimeter in a 1% sulphuric acid solution at 90 degrees C.

* * * * *